(12) United States Patent
Nahar

(10) Patent No.: US 11,772,496 B2
(45) Date of Patent: Oct. 3, 2023

(54) REGENERATIVE BRAKING SYSTEM OF AN AUTOMOBILE AND A METHOD TO OPERATE

(71) Applicant: Anusheel Nahar, Bangalore (IN)

(72) Inventor: Anusheel Nahar, Bangalore (IN)

(73) Assignee: Anusheel Nahar

( * ) Notice: Subject to any disclaimer, the term of this patent is extended or adjusted under 35 U.S.C. 154(b) by 200 days.

(21) Appl. No.: 17/094,974

(22) Filed: Nov. 11, 2020

(65) Prior Publication Data

US 2022/0063416 A1 Mar. 3, 2022

(30) Foreign Application Priority Data

Aug. 26, 2020 (IN) .............................. 202041036732

(51) Int. Cl.
*B60L 7/16* (2006.01)
*B60L 50/40* (2019.01)

(52) U.S. Cl.
CPC ................. *B60L 7/16* (2013.01); *B60L 50/40* (2019.02); *B60L 2240/14* (2013.01); *B60L 2240/441* (2013.01); *B60L 2240/642* (2013.01)

(58) Field of Classification Search
CPC ........ B60L 7/16; B60L 50/40; B60L 2240/14; B60L 2240/441; B60L 2240/642
See application file for complete search history.

(56) References Cited

U.S. PATENT DOCUMENTS

| 8,789,472 | B2* | 7/2014 | Mai | B61C 17/06 105/49 |
|---|---|---|---|---|
| 10,427,520 | B2* | 10/2019 | Dalum | B60K 17/28 |
| 10,940,829 | B1* | 3/2021 | Herhusky | B60Q 9/00 |
| 2005/0045058 | A1* | 3/2005 | Donnelly | B60L 58/19 105/26.05 |
| 2005/0192727 | A1* | 9/2005 | Shostak | G07C 5/0808 701/1 |
| 2010/0262308 | A1* | 10/2010 | Anderson | B60G 13/14 700/287 |

(Continued)

FOREIGN PATENT DOCUMENTS

| CN | 104648166 A | 5/2015 |
|---|---|---|
| CN | 106774131 A | 5/2017 |
| CN | 110171299 A | 8/2019 |

(Continued)

*Primary Examiner* — Peter D Nolan
*Assistant Examiner* — Demetra R Smith-Stewart
(74) *Attorney, Agent, or Firm* — Jason C. Cameron

(57) ABSTRACT

A regenerative braking system of an automobile is disclosed. The system also includes an alternator, a plurality of supercapacitors and a power converter subsystem. The system also includes an automobile status sensing subsystem, which identifies a real time motion status of the automobile via one of an accelerometer and a pulse signal measurement. The power converter subsystem is operatively coupled to electrical system and the plurality of supercapacitors. The power converter subsystem transfers generated energy from the alternator and store the generated energy in the plurality of supercapacitors in an event of the braking of the automobile. The stored energy, which is stored in the supercapacitors, is slowly returned to the electrical systems of the automobile during idling, accelerating or running conditions.

7 Claims, 5 Drawing Sheets

(56) References Cited

U.S. PATENT DOCUMENTS

2015/0224845 A1* 8/2015 Anderson ............ B60G 17/019
701/37

FOREIGN PATENT DOCUMENTS

| EP | 3626485 A1 * | 3/2020 | ........... B60G 11/265 |
| IN | 3480/CHE/2014 | 2/2016 | |
| KR | 101141770 B1 | 5/2012 | |
| WO | WO-0032462 A1 * | 6/2000 | ........... B60K 17/043 |

* cited by examiner

REGENERATIVE BRAKING SYSTEM OF AN AUTOMOBILE AND A METHOD TO OPERATE

EARLIEST PRIORITY DATE

This Application claims priority from a complete patent application filed in India having Patent Application No. 202041036732, filed on Aug. 26, 2020, and titled "REGENERATIVE BRAKING SYSTEM OF AN AUTOMOBILE AND A METHOD TO OPERATE".

FIELD OF INVENTION

Embodiments of a present disclosure relates to a retrofit braking system, and more particularly to a regenerative braking system of an automobile and a method to operate the same.

BACKGROUND

In urban driving environment, braking is a very frequent activity because of potholes, speed breakers, traffic, signals, turns, pedestrians and the like. Tests performed revealed that braking of an automobile occurs 4 to 5 times per Km and each event lasts for about 3 to 6 seconds during light traffic in residential areas or non-peak hours. Peak hour traffic on main roads is even worse.

As per the fuel economy data, out of every 100 units represented by fuel in terms of chemical energy, only 4% goes in actual traction, 6% goes in braking energy and 3% goes in aerodynamic drag in worldwide urban driving conditions. In developing countries, the driving conditions and the proportion of actual traction energy is much worse and braking energy is also more.

Furthermore, the standby losses in developing world urban driving conditions are more as automobile idles at signals and urban traffic. Higher the idling RPM and the duration, more is the fuel consumption. It is imperative that the engine RPM is quickly reduced during braking and clutch pressed condition to save fuel.

Regenerative braking allows recovery of some of the energy during braking events. In conventionally known regenerative braking system, an automobile is fitted with an electrical machine and a separate drive. Electrical machine performs regeneration or motoring operation i.e. conversion of electrical energy from or to mechanical energy respectively. The electrical energy is controlled using an electrical drive which is a power electronic device. The drive controls the electrical energy flow from/to electrical machine (motor/regenerator) into/from a storage system. A storage system may comprise of battery/capacitor bank/air compressor plus compressed air storage tank/flywheel. It is pertinent to note that the automobile is interfaced with a complex microcontroller-based drive for such application.

Hence, there is a need for an improved regenerative braking system of an automobile and a method to operate the same and therefore address the aforementioned issues.

BRIEF DESCRIPTION

In accordance with one embodiment of the disclosure, a regenerative braking system of an automobile is disclosed. The system includes an automobile status sensing subsystem. The automobile status sensing subsystem is operatively coupled to the one or more processors. The automobile status sensing subsystem is configured to identify a real time motion status of the automobile via one of an accelerometer and/or pulse signal measurement.

The system also includes an alternator. The alternator is coupled to the automobile drivetrain. The alternator adjusts generation of energy in accordance to provided load for supply of power up to a pre-defined designed capacity. The alternator essentially maintains the voltage of the electrical system. In most automobiles having a nominal rated 12 V lead acid battery, this voltage is 14.4 V. Electronics internal to the alternator change the field excitation of the alternator to maintain it. Increase in load demand reduces the system voltage, forcing the alternator to output more power until the set voltage of 14.4 V is reached and vice-versa, thereby achieving the matching of load demand and generated electrical output of the alternator.

The system also includes a plurality of supercapacitors. The plurality of supercapacitors is configured to store energy generated by the alternator. The system also includes a power converter subsystem. The power converter subsystem is operatively coupled to electrical system and the plurality of supercapacitors. The power converter subsystem is configured to transfer generated energy from the alternator and store the generated energy in the plurality of supercapacitors.

In accordance with one embodiment of the disclosure, a method for regenerative braking in an automobile is disclosed. The method also includes identifying real time motion status of the automobile via one of an accelerometer and pulse signal measurement. The method also includes transferring generated energy from an alternator in an event of the braking of the automobile. The method also includes storing energy as generated by the alternator. The method also includes resupplying energy back to one or more electrical system when the automobile is not braking.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
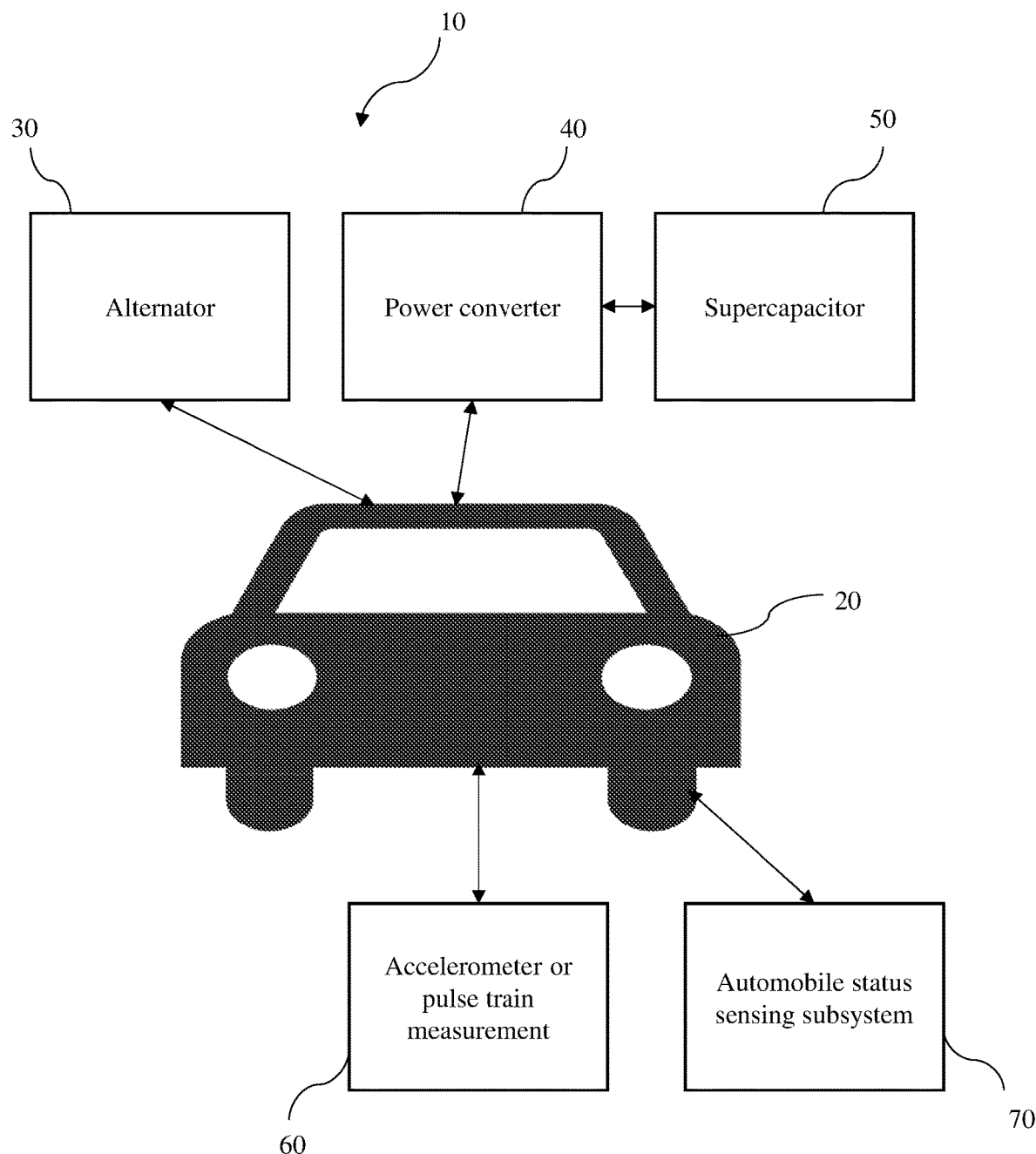
FIG. 1 is a schematic representation of a regenerative braking system of an automobile in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a regenerative braking system of an automobile is disclosed. The system includes an automobile status sensing subsystem. The automobile status sensing subsystem is operatively coupled to one or more processors. The automobile status sensing subsystem is configured to identify real time motion status of the automobile via an accelerometer. Another method is using a pulse signal measurement which is related to engine speed and is used for identifying the real time motion status of the automobile. The pulse frequency changes are directly proportional to engine speed. Some automobiles do provide access to such as signal.

Connecting to an alternator terminal directly and adding a simple circuit can easily generate a pulse train which may also be used to determine the vehicle speed. However, in the absence of any direct pulse train given by automobile manufacture, any other method is complicated to install as several components in a normal automobile need to be removed and put back. The pulse train may be integrated in with one or several microcontrollers or processors and subjected to signal processing to derive the automobile status.

The system includes an alternator. The alternator is operatively connected directly to the engine and drive train through a conveyor belt. The alternator is usually part of the automobile and runs continuously to keep the battery charged and support the electrical system loads in the automobile such as ignition, lights, pumps etc.

The system also includes a power converter subsystem. The power converter subsystem is operatively coupled to electrical system and the multiple capacitors. The power converter subsystem is configured to transfer generated energy from the alternator and store the generated energy in the plurality of supercapacitors. The power converter itself may be constructed using one of the several known topologies some of which are known as buck, boost, buck-boost fly back, forward and several others.

FIG. 1 is a schematic representation of a regenerative braking system 10 of an automobile 20 in accordance with an embodiment of the present disclosure. In one specific embodiment, the regenerative braking system 10 of the automobile 20 as a whole comprises of components such as an alternator 30, a power converter 40, a supercapacitor 50 and an accelerometer 60. In such embodiment, an automobile status sensing subsystem 70 detects in real time the travelling status of the automobile 20 via the accelerometer 60.

As used herein, the term "regenerative braking systems (RBSs)" are a type of kinetic energy recovery system that transfers the kinetic energy of an object in motion into potential or stored energy to slow the vehicle down (and later the stored energy is reused), and as a result increases fuel efficiency. In one embodiment, the automobile 20 refers to any self-propelled vehicle that travels on land.

Figure 2:
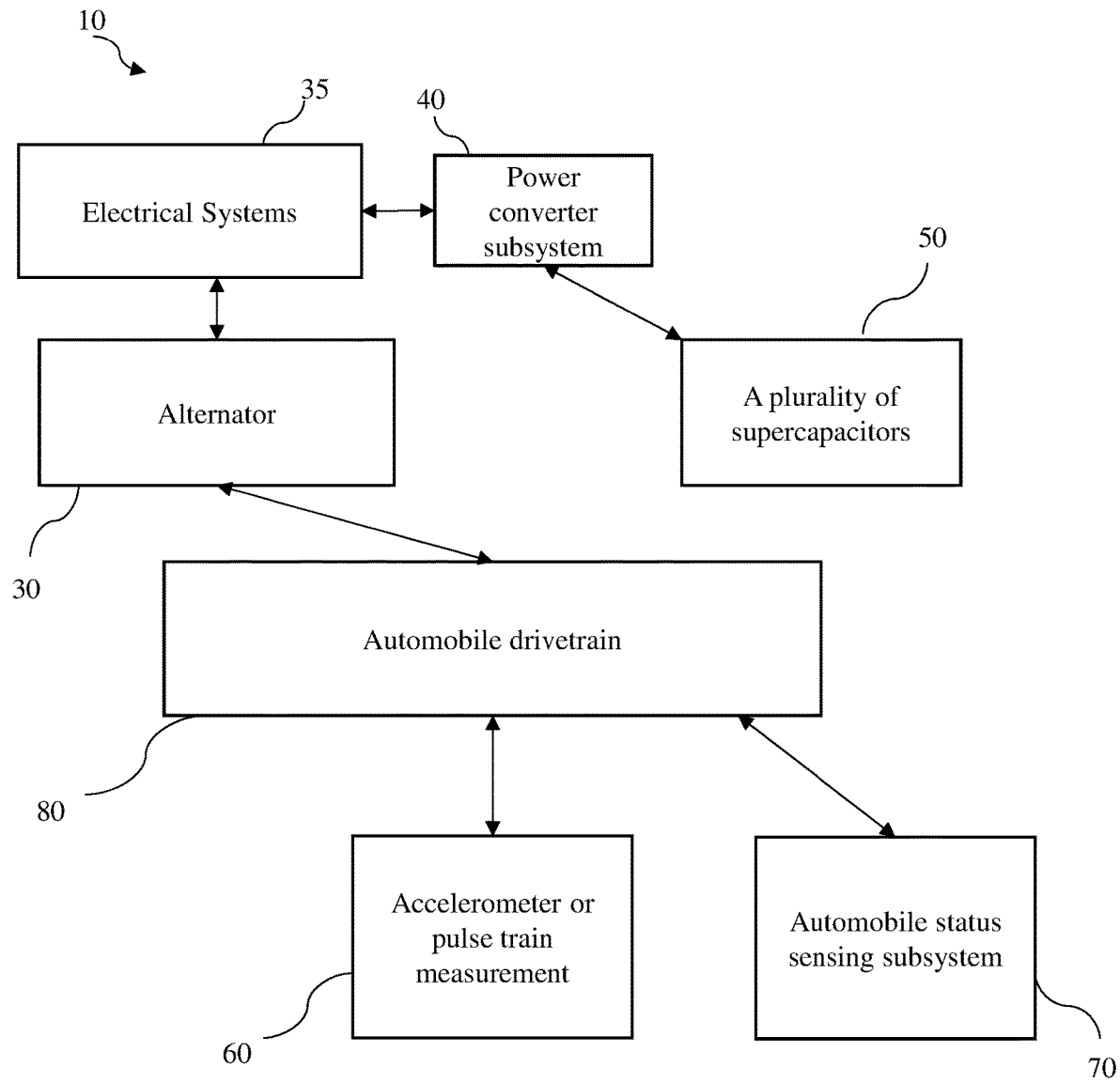
FIG. 2 is a block diagram representation of the regenerative braking system of the automobile in accordance with an embodiment of the present disclosure.

FIG. 2 is a block diagram representation of the regenerative braking system 10 of the automobile 20 in accordance with an embodiment of the present disclosure. The regenerative braking system 10 also includes an automobile status sensing subsystem 70. The automobile status sensing subsystem 70 is operatively coupled to the one or more processors. The automobile status sensing subsystem 70 identifies a real time motion status of the automobile via one of an accelerometer or pulse signal measurement 60. In such embodiment, the accelerometer 60 identifies the real time motion status of the automobile. In such embodiment, the accelerometer 60 measures and sends the signal to a microcontroller, which interprets the measured information to determine the automobile real time status.

Additionally, there are other methods that may be used to sense the automobile status. In another embodiment, a pulse signal is being used to in relation to engine speed and is used for identifying the real time motion status of the automobile. The pulse frequency changes are directly proportional to engine speed. Some automobiles do provide access to such as signal.

In such embodiment, the method of implementation is connecting to an alternator terminal directly and adding a simple circuit can easily generate a pulse train which may also be used to determine the vehicle speed. However, in the absence of any direct pulse train given by automobile manufacture, any other method is complicated to install as several components in a normal automobile need to be removed and put back. The pulse train may be integrated in with one or several microcontrollers or processors and subjected to signal processing to derive the automobile status.

As used herein, the term "accelerometer" is an electromechanical device used to measure acceleration/and component of acceleration due to gravity in the direction of the vehicle. The regenerative braking system 10 includes one or more processors connected to a server using Wi-Fi or another wireless device. In one embodiment, the server may comprise a cloud server.

In one embodiment, the real time motion status of the automobile comprises at least one of braking of the automobile, acceleration of the automobile, uphill movement of the automobile, downhill movement of the automobile, gear shift of the automobile and change of RPM of the automobile.

In one exemplary embodiment, the accelerometer 60 may be a 3-axis accelerometer like ADXL777. Such accelerometer 60 has three independent accelerometers mounted perpendicularly inside a single chip package. When rigidly fixed to the automobile frame, the device measures the acceleration experienced by the automobile in at least one of x-axis, y-axis and z-axis or combination thereof. By aligning one of the accelerometer axis along the vehicle direction (front-back) when the accelerometer is mounted, acceleration in the direction of vehicle motion may be measured directly and outputted in a readable form by the integrated circuit (IC). Using signal processing it is possible to deduce the acceleration even if the accelerometer is not mounted in alignment with vehicle motion direction. Other embodiments may involve gyroscope I/Cs or I/Cs with accelerometer and gyroscope integrated. Combining gyroscope data and accelerometer data, more precise estimate of vehicle status can be obtained.

In another exemplary embodiment, when the automobile is moving uphill or downhill, the accelerometer 60 which is along the automobile motion axis will measure the change in gravity. In yet another exemplary embodiment, when the automobile is accelerating or decelerating the accelerometer 60 will measure forward inertial force when a brake is applied and a backward inertial force when the automobile accelerates. In such embodiment, for acceleration and braking, time information may also be combined with accelerometer output to get better result. In one exemplary embodiment, gear change may be determined by analysing signature on the accelerometer signal as there is a momentary change in speed which corresponds to acceleration.

The alternator 30 enables generation of energy by converting mechanical energy into the AC electrical energy. The onboard rectifier in the alternator subassembly converts the AC electrical energy to DC. The alternator 30 adjusts generation of energy in accordance to provided load for supply of power up to a maximum pre-defined capacity. In the event of braking 20, the power converter effectively increases the load on the system forcing the alternator to generate more electrical power to meet the increased load.

It is pertinent to note that here the alternator 10 as provided during automobile manufacturing is being used for performing regenerative braking technique. In addition to that, the alternator 30 is a unidirectional device to the extent that the alternator 30 may only convert mechanical (kinetic) energy into electrical energy and not vice versa.

The regenerative braking system 10 also includes multiple supercapacitors 50. The multiple supercapacitors 50 stores energy generated by the alternator 30. As used herein, the term "supercapacitor", also called an ultracapacitor, is a high-capacity capacitor with a capacitance value much higher than other capacitors, but with lower voltage limits, that bridges the gap between electrolytic capacitors and rechargeable batteries.

Ultra-capacitors are a new technology that allows any system to store 20 times more energy than the conventional electrolytic capacitor. When compared with lead-acid batteries, the ultra-capacitors may be charged and discharged thousands of times without performance deterioration. These characteristics may be used in combination with normal electrochemical batteries to improve the transient performance.

The regenerative braking system 10 also includes a power converter subsystem 40. The power converter subsystem 40 is operatively coupled to electrical system 35 and the plurality of supercapacitors 50. The power converter subsystem 40 configured to transfer generated energy from the alternator 30 and store the generated energy in the plurality of supercapacitors 50.

In another embodiment, the energy stored in the multiple supercapacitors 50 is used by one or more electrical systems associated with the automobile during acceleration of the automobile, uphill movement of the automobile, downhill movement of the automobile, gear shift of the automobile and change of RPM of the automobile. In one embodiment, the one or more electrical systems may include ignition coils, internal pumps, lights, vipers, audio and the like.

Additionally, in another embodiment, when the energy is put back into the electrical system during the condition of acceleration, the alternator 30 is forced to reduce its output as the net demand on the alternator 30 falls. As the alternator 30 reduces its output, being an electrical machine, the input mechanical energy to alternator also falls. This mechanical energy comes from the rotational motion of the engine. The demand on the engine therefore falls and thus the mechanical load on the engine falls. As the engine load falls, it has to burn less fuel. Sure, the amount is very tiny compared to engine output, but as the number of times braking happens in urban driving is more, the savings add up and become significant over several thousand Km.

It is pertinent to note that, a controller associated with the internal alternator 30 automatically adjusts in response to the load and supplies power to the maximum capacity. The power rating of the alternator 30 is typically 1-2 KW and is minor compared to the engine power or the power required in the braking of approx. or more than 1000 Kg automobile. Therefore, there is hardly any perceived difference in the automobile drivability when the power converter 40 turns on and loads the drive train. Depending on the capacity of supercapacitors 50 available, up to 5000 J may be recovered in every braking event. Since the number of braking events is 4 to 5/Km in modest traffic, the amount of recovered energy adds up. Combined with the fact that the alternator 30 has very low efficiency of about 50 to 60%, the recovered energy is more valuable.

The amount of kinetic energy in a moving automobile is much more than that may be quickly absorbed by ultracapacitors 50 or processed by the power converter 40. Even small percentage of energy of about 10 to 20% adds over repeated braking events; and provides significant fuel efficiency improvement.

Furthermore, the regenerative braking system 10 also includes a real time motion status storage subsystem operable by the one or more processors. The real time motion status storage subsystem stores the real time motion status of the automobile identified by the automobile status sensing subsystem 70 and a level of the energy stored in the multiple supercapacitors 50 and other calculated and measurement parameters such as battery health/battery voltage/no. cycles/charging and discharging currents, power flow and energy storage/recovery and refeed data, temperature of the supercapacitors and power converter components. In one embodiment, the storage may be remote storage or local storage. In such embodiment, the stored data may be collected and sent over by Wi-Fi or GSM network.

Figure 3:
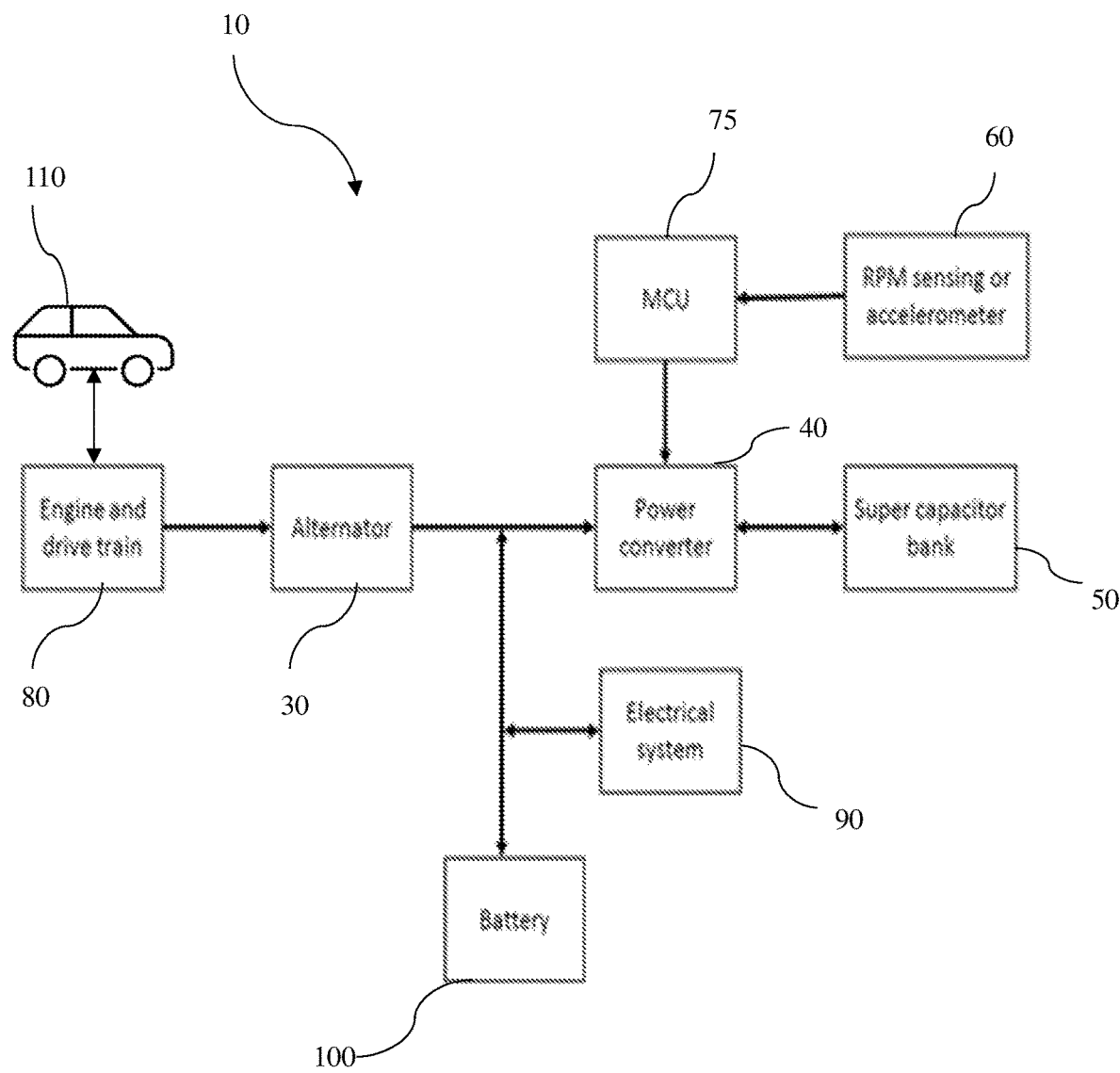
FIG. 3 is a schematic representation of an exemplary embodiment representing the regenerative braking system in the automobile of FIG. 1 in accordance with an embodiment of the present disclosure.

FIG. 3 is a schematic representation of an exemplary embodiment representing the regenerative braking system 10 in the automobile of FIG. 1 in accordance with an embodiment of the present disclosure. In one specific exemplary embodiment, a car X 110 is retrofitted with the regenerative braking system 10 components. The regenerative braking system 10 components are coupled in the conjunction of the car X 110 engine and drive train 80. The regenerative braking system 10 components include a alternator 30, a power converter 40, a super capacitor bank 50, an accelerometer 60 and a Car X status sensing subsystem enable by a micro-controller 75.

The sensing subsystem 70 as shown in FIG. 2 in conjunction with the microcontroller 75 smart algorithms determines whether the car X 110 is braking, accelerating, going downhill, uphill, vibrations due to road conditions or gear shifts. In such exemplary embodiment, during the braking status of the car X 110, the power converter 40 is triggered and simultaneously draws as much power as possible subject to physical and safety constraints from the alternator 30 and stores into the super capacitor bank 50 as energy.

It is pertinent to note that the alternator 30 is directly connected to the drive train 80, effective load directly comes onto the drive train 80. Resulting in loading of the engine and braking action. This recovers some of the energy that would have been lost in mechanical braking in frictional losses in the brake drums otherwise. The stored energy in the super capacitor bank 50 may be used by electrical system associated with the car X 110. In such embodiment, a normal electrochemical battery 100 may be charged for latter usage or better still fed back into the electrical system, reducing the demand on alternator/thereby reducing engine load during non-braking and thus saving fuel.

In such exemplary embodiment, the car X 110 detected status such as braking, accelerating, going downhill, uphill, vibrations due to road conditions or gear shifts may be stored in a remote storage or a local storage for car X 110 user understanding via a real time motion status storage subsystem. Details regarding level of charge in the supercapacitors bank may also be stored in the real time motion status storage subsystem.

Figure 4:
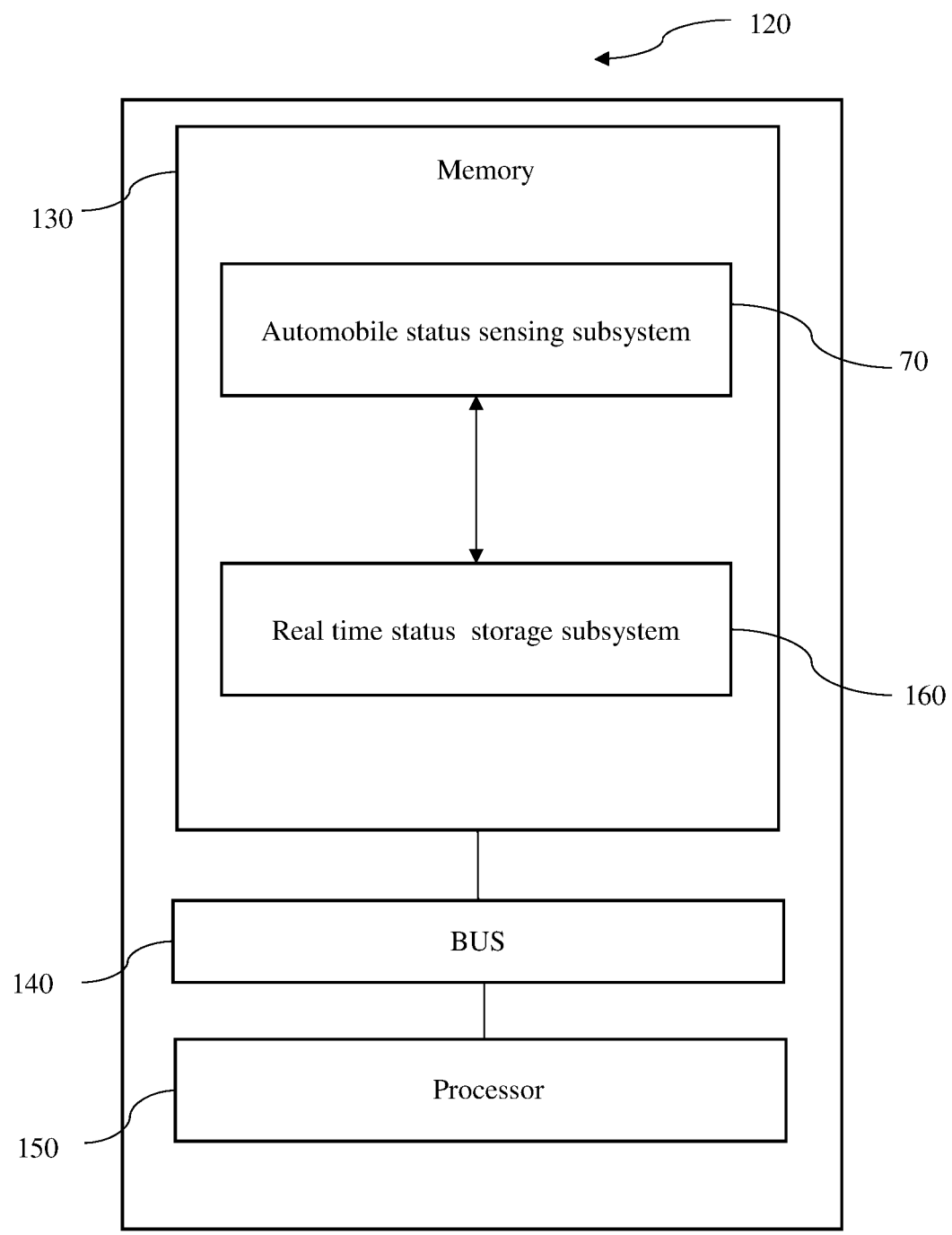
FIG. 4 is a block diagram of a computer or a server in accordance with an embodiment of the present disclosure.

FIG. 4 is a block diagram of a computer or a server 120 in accordance with an embodiment of the present disclosure. The server 120 includes processors 150, and memory 130 coupled to the processor(s) 150.

The processor(s) 150, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 130 includes a plurality of modules stored in the form of executable program which instructs the processor 150 via a bus 140 to perform the method steps illustrated in FIG. 1. The memory 130 has following modules: the automobile status sensing subsystem 70 and the real time motion status storage subsystem 160.

The automobile status sensing subsystem 70 is configured to identify a real time motion status of the automobile via an accelerometer. The real time motion status storage subsystem 160 is configured to store the real time motion status of the automobile identified by the automobile status sensing subsystem and a level of the energy stored in the plurality of supercapacitors.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 150.

Figure 5:
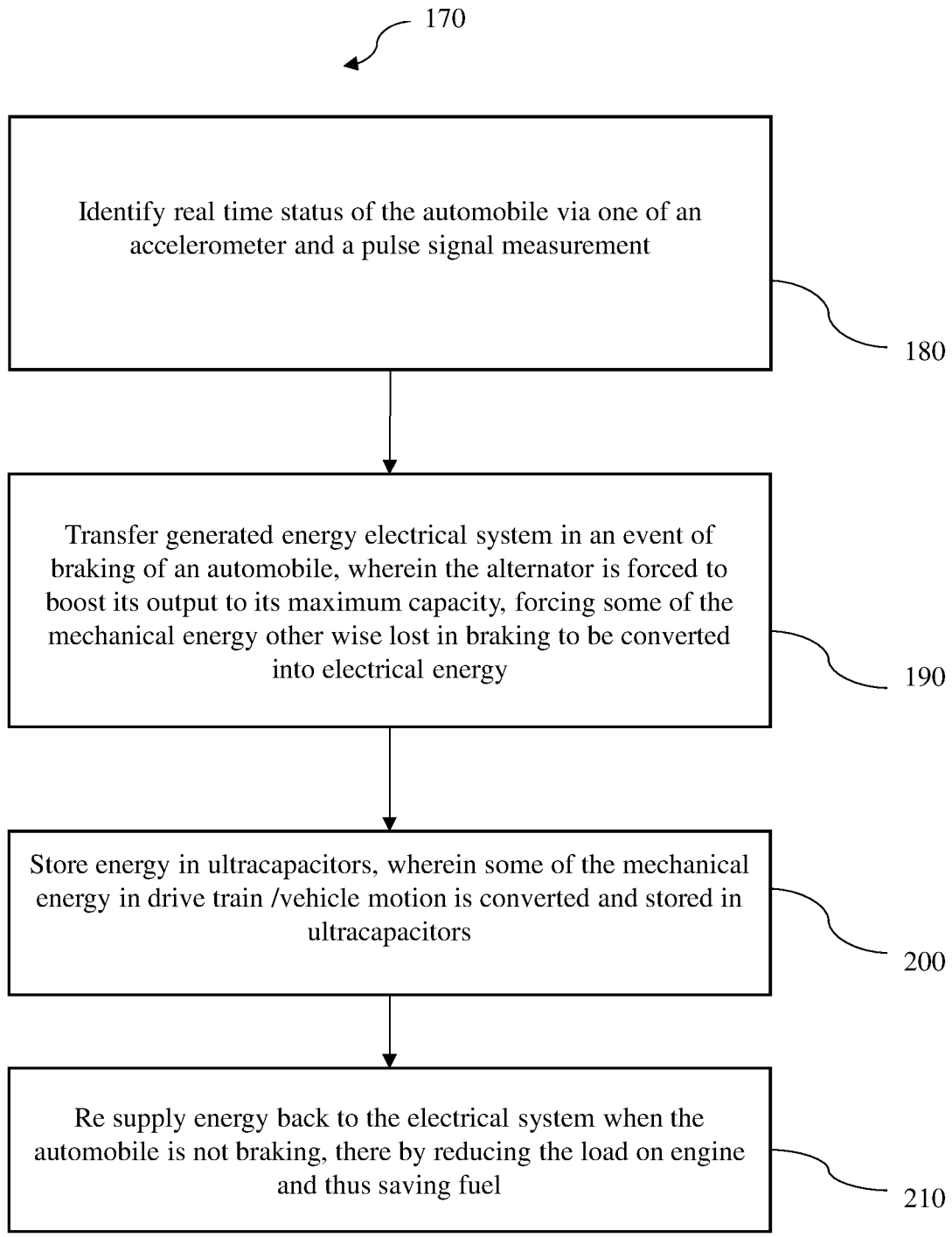
FIG. 5 is a flowchart representing the steps of the method for regenerative braking in an automobile in accordance with an embodiment of the present disclosure.

FIG. 5 is a flowchart representing the steps of the method 170 for regenerative braking in an automobile in accordance with an embodiment of the present disclosure. The method 170 also includes identifying real time motion status of the automobile via an accelerometer or a pulse signal in step 180. In one embodiment, identifying the real time motion status of the automobile via the accelerometer or the pulse signal includes identifying the real time motion status of the automobile via the accelerometer or the pulse signal by an automobile status sensing subsystem.

The method 170 also includes identifying the real time motion status of the automobile comprising at least one of braking of the automobile, acceleration of the automobile, uphill movement of the automobile, downhill movement of the automobile, gear shift of the automobile and change of RPM of the automobile. In one embodiment, identifying the real time motion status of the automobile comprising at least one of braking of the automobile, acceleration of the automobile, uphill movement of the automobile, downhill movement of the automobile, gear shift of the automobile and change of RPM of the automobile includes identifying the real the real time motion status of the automobile by the automobile status sensing subsystem.

The method 170 also includes transferring generated energy from the electrical system which forces the alternator to produce more power up-to its limit in step 190. In one embodiment, transferring generated energy from the alternator in the event of the braking of the automobile includes transferring generated energy from the alternator in an event of the braking of the automobile by a power converter subsystem.

In another embodiment, transferring generated energy from the alternator in the event of the braking of the automobile includes the alternator being forced to boost its output to its maximum capacity, forcing some of the mechanical energy otherwise lost in braking to be converted into electrical energy.

The method 170 includes storing energy as generated by the alternator in step 200. In one embodiment, storing the energy as generated by the alternator includes storing the energy as generated by the alternator by a plurality of supercapacitors. In another embodiment, storing the energy as generated by the alternator includes some of the mechanical energy in drive train/vehicle motion being converted and stored in supercapacitors.

The method 170 also includes resupplying energy back to one or more electrical system when the automobile is not braking in step 210. In one embodiment, the condition of the automobile is not braking includes uphill movement of the automobile, downhill movement of the automobile, gear shift of the automobile and change of RPM of the automobile.

The method 170 also includes storing the real time motion status of the automobile identified by the automobile status sensing subsystem and a level of the energy stored in the plurality of supercapacitors. In one embodiment, storing the real time motion status of the automobile identified by the automobile status sensing subsystem and the level of the energy stored in the plurality of supercapacitors includes storing the real time motion status of the automobile identified by the automobile status sensing subsystem and the level of the energy stored in the plurality of supercapacitors by a real time motion status storage subsystem.

Present disclosure of regenerative braking system in conjunction with an automobile save fuel as standby losses reduces to a significant level. In any automobile, when brake is pressed at slow speed, clutch also needs to be pressed to prevent engine stall. When clutch is pressed, engine is disconnected from drive train. The engine speed needs to quickly reduce to save fuel. The faster the engine runs, more fuel consumption happens. Present disclosed system puts an additional load on the engine and the engine RPM reduces much quicker than the RPM would otherwise have reduced. The system saves fuel and thereby improves mileage in the automobile using regenerative braking.

When braking happens, by indirectly increasing the load on the electrical system, the alternator is forced to produce more (and thus convert more of the to be wasted kinetic energy) into electrical energy. The excess withdrawal of energy from the electric system is put into ultra-capacitors. Downhill and braking behaviour is similar i.e. load the system/convert and store more when possible.

Application of the present disclosed system facilitates about 7 to 8% savings in fuel and emissions per Km. The system further reduces the number of trips to the fuel station. On the global scale, such savings has potential to cut automobile emissions significantly. The system was tested on a Hyundai i10 2012 model vehicle for 2000 Km with and without the device connected and the mileage increase corroborates the theoretical.

Additionally, the data related to accelerometer, RPM, stored energy, roundtrip efficiency and the like may be stored easily in real time in the cloud server. Such data may be used in further analytics for one or more factors such as road conditions, driving recommendations and the like. It is pertinent to note that the system may also be retrofitted with two wheelers and three wheelers.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A regenerative braking system of an automobile, the regenerative braking system comprising:
    an automobile status sensing subsystem communicatively coupled to the one or more processors, wherein the automobile status sensing subsystem is configured to identify a real time motion status of the automobile via one of an accelerometer and a pulse signal measurement,
        wherein the real time motion status of the automobile comprises identifying braking of the automobile, acceleration of the automobile, uphill movement of the automobile, downhill movement of the automobile, gear shift of the automobile and change of RPM of the automobile, wherein the accelerometer detects uphill movement of the automobile and downhill movement of the automobile by measure of change in gravity, wherein the accelerometer detects acceleration or deceleration of the automobile by measure of a forward inertial force when brake is applied and a backward inertial force when the automobile accelerates, and wherein the accelerometer detects a gear shift by analyzing signature on the accelerometer signal due to a momentary change in speed of the automobile;
    an alternator coupled automobile drivetrain, wherein the alternator adjusts generation of energy in accordance to provided load for supply of power up to a pre-defined maximum capacity;
    a plurality of supercapacitors, wherein the plurality of supercapacitors is configured to store energy generated by the alternator;
    a power converter subsystem operatively coupled to the plurality of supercapacitors and electrical systems, wherein the power converter subsystem is configured to transfer generated energy from the alternator and store the generated energy in the plurality of supercapacitor; and
    an accelerometer or a pulse train measurement communicatively coupled to the automobile drivetrain, wherein change in pulse frequency associated to the pulse signal measurement is directly proportional to engine speed, thereby detecting the real time motion status of the automobile.

2. The regenerative braking system as claimed in claim 1, comprising a real time motion status storage subsystem operable by the one or more processors, wherein the real time motion status storage subsystem is configured to store the real time motion status of the automobile identified by the automobile status sensing subsystem and a level of the energy stored in the plurality of supercapacitors.

3. The regenerative braking system as claimed in claim 1, wherein the energy stored in the plurality of supercapacitors is used by one or more electrical system associated with the automobile during acceleration of the automobile, uphill movement of the automobile, downhill movement of the automobile, gear shift of the automobile and change of RPM of the automobile.

4. The regenerative braking system as claimed in claim 1, wherein the accelerometer is configured to experience acceleration of the automobile in at least one of x-axis, y-axis and z-axis.

5. A method for regenerative braking in an automobile, the method comprising:

identifying, by an automobile status sensing subsystem, real time motion status of the automobile via one of an accelerometer and a pulse signal measurement, wherein the accelerometer detects an uphill movement of the automobile and a downhill movement of the automobile by measure of change in gravity, wherein the accelerometer detects acceleration or deceleration of the automobile by measure of a forward inertial force when brake is applied and a backward inertial force when the automobile accelerates, and wherein the accelerometer detects a gear shift by analyzing signature on the accelerometer signal due to a momentary change in speed of the automobile;

transferring generated energy, by a power converter subsystem, from an alternator in an event of the braking of the automobile;

storing energy, by a plurality of supercapacitors, as generated by the alternator; and resupplying energy back to one or more electrical system when the automobile is not braking.

6. The method as claimed in claim 5, wherein identifying, by the automobile status sensing subsystem, the real time motion status of the automobile comprising at least one of braking of the automobile, acceleration of the automobile, uphill movement of the automobile, downhill movement of the automobile, gear shift of the automobile and change of RPM of the automobile.

7. The method as claimed in claim 5, comprising storing, by a real time motion status storage subsystem, the real time motion status of the automobile identified by the automobile status sensing subsystem and a level of the energy stored in the plurality of supercapacitors.

\* \* \* \* \*